(12) United States Patent
Kato (10) Patent No.: US 9,536,566 B2
(45) Date of Patent: Jan. 3, 2017

(54) VIDEO PROCESSING DEVICE, VIDEO PROCESSING METHOD, AND RECORDING MEDIUM

(71) Applicant: CASIO COMPUTER CO., LTD., Tokyo (JP)

(72) Inventor: Yoshiyuki Kato, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 43 days.

(21) Appl. No.: 14/566,881

(22) Filed: Dec. 11, 2014

(65) Prior Publication Data

US 2015/0170709 A1  Jun. 18, 2015

(30) Foreign Application Priority Data

Dec. 18, 2013  (JP) .................................. 2013-261275

(51) Int. Cl.

| | |
|---|---|
| *H04N 5/77* | (2006.01) |
| *G11B 27/00* | (2006.01) |
| *G11B 27/06* | (2006.01) |
| *H04N 21/2747* | (2011.01) |
| *H04N 21/41* | (2011.01) |
| *H04N 21/4147* | (2011.01) |
| *H04N 21/436* | (2011.01) |
| *H04N 21/6587* | (2011.01) |

(52) U.S. Cl.
CPC .............. *G11B 27/06* (2013.01); *H04N 5/772* (2013.01); *H04N 21/2747* (2013.01); *H04N 21/4135* (2013.01); *H04N 21/4147* (2013.01); *H04N 21/43622* (2013.01); *H04N 21/6587* (2013.01)

(58) Field of Classification Search
USPC ......................................................... 386/278
See application file for complete search history.

(56) References Cited

U.S. PATENT DOCUMENTS

| | | | | |
|---|---|---|---|---|
| 2005/0088546 | A1* | 4/2005 | Wang ..................... | H04N 5/232 348/239 |
| 2006/0156364 | A1* | 7/2006 | Shinkai ................. | G06Q 10/06 725/115 |
| 2009/0136221 | A1* | 5/2009 | Nakamura ......... | H04N 1/00204 396/1 |
| 2011/0217019 | A1* | 9/2011 | Kamezawa .......... | H04N 9/8042 386/224 |
| 2015/0062359 | A1* | 3/2015 | Tsui ................... | H04N 5/23258 348/208.2 |

FOREIGN PATENT DOCUMENTS

JP        2009-49951 A        3/2009

* cited by examiner

*Primary Examiner* — Nigar Chowdhury
(74) *Attorney, Agent, or Firm* — Chen Yoshimura LLP (57) ABSTRACT

An imaging device includes a video acquisition unit, a tilt information acquisition unit, and an extraction period determination unit. The video acquisition unit obtains videos. The tilt information acquisition unit obtains information about shifts in posture, which are changes in angles of view or the like, during obtaining of the videos by the video acquisition unit. The extraction period determination unit determines periods to extract in the respective videos in accordance with the information obtained by the tilt information acquisition unit.

12 Claims, 5 Drawing Sheets

VIDEO PROCESSING DEVICE, VIDEO PROCESSING METHOD, AND RECORDING MEDIUM

BACKGROUND OF THE INVENTION

Technical Field

The present invention relates to a video processing device, a method of processing a video, and a recording medium.

Background Art

Conventionally, a system is known in which a camera is mounted on the head of a user and used to record what the user is seeing, and this is used in a life blog, as described in Japanese Laid-Open Patent Application No. 2009-49951.

Patent Document 1 discloses a technique in which imaging parameters are configured in accordance with the psychological state of the user and then a video is recorded.

SUMMARY OF THE INVENTION

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a video processing device including a processor configured to: acquire data representing a video that has been taken by a video capturing unit; acquire data representing a posture of the video capturing unit while the video capturing unit is taking the video; and edit the video in accordance with the data representing the posture of the video capturing unit.

In another aspect, the present disclosure provides a method of processing a video, including: acquiring data representing a video that has been taken by a video capturing unit; acquiring data representing a posture of the video capturing unit while the video capturing unit is taking the video; and editing the video in accordance with the data representing the posture of the video capturing unit.

In another aspect, the present disclosure provides a non-transitory storage medium that stores instructions executable by a computer, said instructions causing the computer to perform the following: acquiring data representing a video that has been taken by a video capturing unit; acquiring data representing a posture of the video capturing unit while the video capturing unit is taking the video; and editing the video in accordance with the data representing the posture of the video capturing unit.

It is to be understood that both the foregoing general description and the following detailed description are exemplary and explanatory, and are intended to provide further explanation of the invention as claimed.

DETAILED DESCRIPTION OF THE PREFERRED EMBODIMENTS

Below, an embodiment of the present invention will be explained with reference to drawings.

Figure 1:
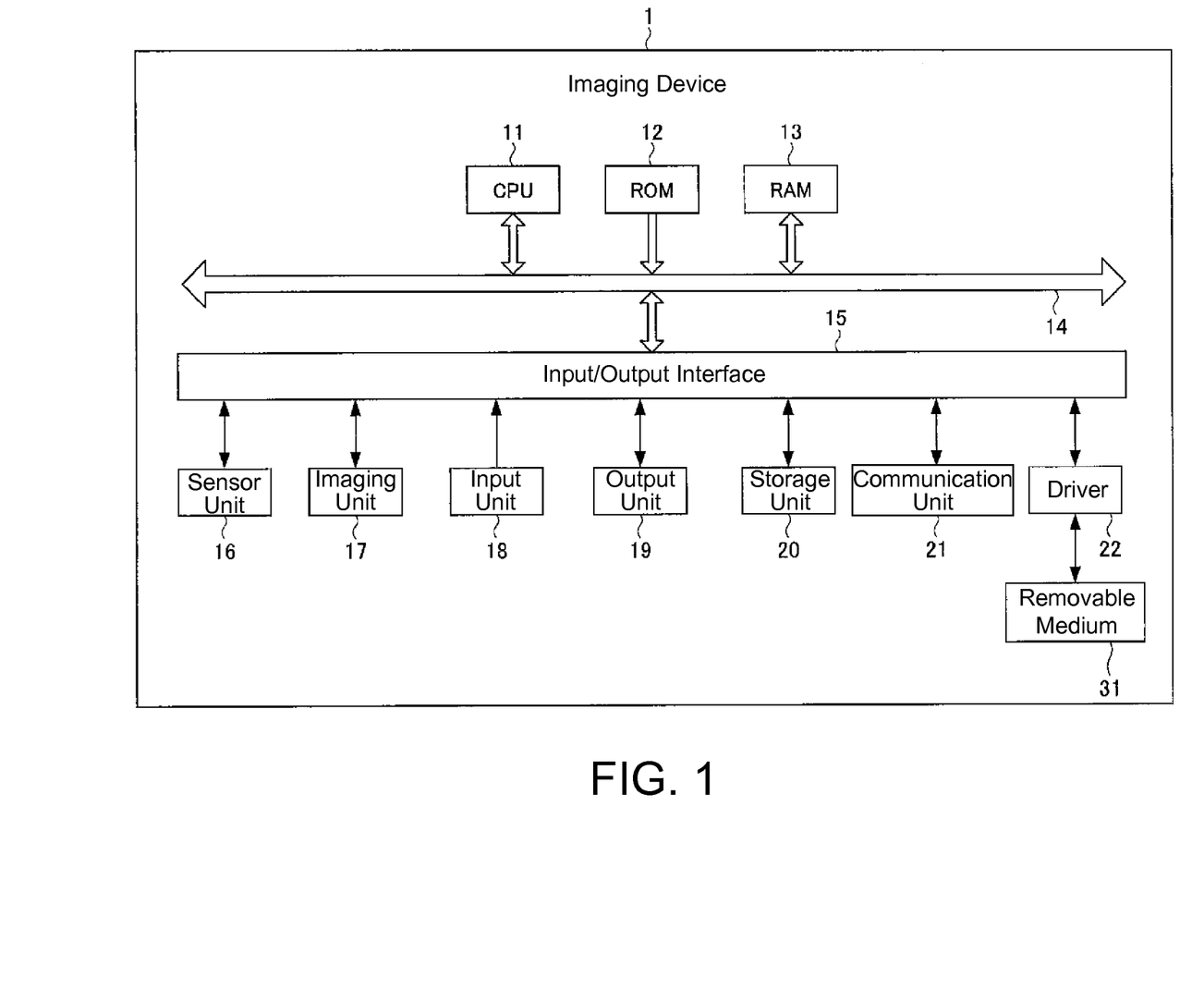
FIG. 1 is a block view of hardware for an imaging device according to one embodiment of a video processing device of the present invention.

FIG. 1 is a block view of hardware for an imaging device according to one embodiment of a video processing device of the present invention.

An imaging device 1 is a wearable camera that is a digital camera, for example.

The wearable camera is attached to the head region of the user and films with the line of view direction (horizontal direction) of the user being the imaging orientation, for example.

The imaging device 1 includes a CPU (central processing unit) 11, a ROM (read only memory) 12, a RAM (random access memory) 13, a bus 14, an input/out interface 15, a sensor unit 16, an imaging unit 17, an input unit 18, an output unit 19, a storage unit 20, a communication unit 21, and a driver 22.

The CPU 11 executes various types or processes in accordance with programs recorded in the ROM 12 or programs loaded into the RAM 13 from the storage unit 20.

The RAM 13 appropriately stores data and the like necessary for the CPU 11 to execute various processes.

The CPU 11, the ROM 12, and the RAM 13 are connected to each other through the bus 14.

The input/output interface 15 is also connected to this bus 14. The imaging unit 17, the input unit 18, the output unit 19, the storage unit 20, the communication unit 21, and the driver 22 are connected to this input/output interface 15.

The sensor unit 16 is constituted of acceleration sensors and the like that measure detectable tilt information such as movement and orientation of the device.

The imaging unit 17, although not shown, includes an optical lens unit and an image sensor.

The optical lens unit is constituted of a lens that concentrates light in order to film an object, such as a focus lens or a zoom lens, for example.

The focus lens forms the object image on a light receiving surface of the image sensor. The zoom lens changes focal length within a uniform range.

The optical lens unit is also provided with a peripheral circuit that adjusts configuration parameters as necessary, such as focus, exposure, white balance, and the like.

The image sensor is constituted of a photoelectric conversion element, an AFE (analog front end), and the like.

The photoelectric conversion element is made of a CMOS (complementary metal oxide semiconductor) or the like, for example. The object image enters the photoelectric conversion element from the optical lens unit. The photoelectric conversion element photoelectrically converts (images) the object and stores an image signal for a uniform length of time and sequentially supplies stored image signals to the AFE as analog signals.

The AFE runs various types of signal processing such as A/D (analog/digital) conversion processing on the analog image signal. A digital signal is generated through the various types of signal processing and outputted as an output signal of the imaging unit 17.

This type of imaging unit 17 output signal is hereinafter referred to as "image data." The image data is appropriately supplied to the CPU 11, an image processing unit (not shown), and the like.

The input unit 18 is formed of various types of buttons and the like, and inputs various types of information in accordance with operation by the user.

The output unit 19 is formed of a display, speaker, and the like, and output images and sound.

The storage unit 20 is formed of a hard disk, DRAM (dynamic random access memory) or the like, and storages various types of image data.

The communication unit 21 controls communication with other devices (not shown) through a network, including the internet.

A removable medium 31 constituted of a magnetic disk, an optical disk, a magneto-optical disk, a semiconductor memory, or the like is appropriately mounted on the driver 22. Programs read from the removable medium 31 by the driver 22 are installed in the storage unit 20 as necessary. The removable medium 31 can also store various types of data such as the image data stored in the storage unit 20 in a manner similar to the storage unit 20.

The imaging device 1 configured as described above has a function that can obtain a video in which there is little shaking of the device and in which there are few shifts in imaging orientation.

Specifically, the imaging device 1 obtains videos taken when the degree of shaking of the device, which is based on shifts in posture of the device, is within a prescribed range, and these videos will serve as videos having few shifts in imaging orientation. In the imaging device 1, when only a portion of a single video has the degree of shaking within this prescribed range, this portion is extracted by an editing process and a video having few shifts in imaging orientation (hereinafter, a "video having few shifts in imaging orientation") is generated. This makes it possible to obtain a video with considerably no shaking (an insignificant amount of shaking). Thus, a user viewing this video would not feel awkwardness or be disturbed due to the shaking.

The imaging device 1 of the present embodiment has a function that performs interval imaging in which a plurality of imaging occurs at prescribed intervals. In the imaging device 1 having this function, one video (hereinafter, the "combined video") is generated when there are a plurality of videos having few shifts in imaging orientation. This makes it possible to generate a combined video constituted of a plurality of videos.

Figure 2:
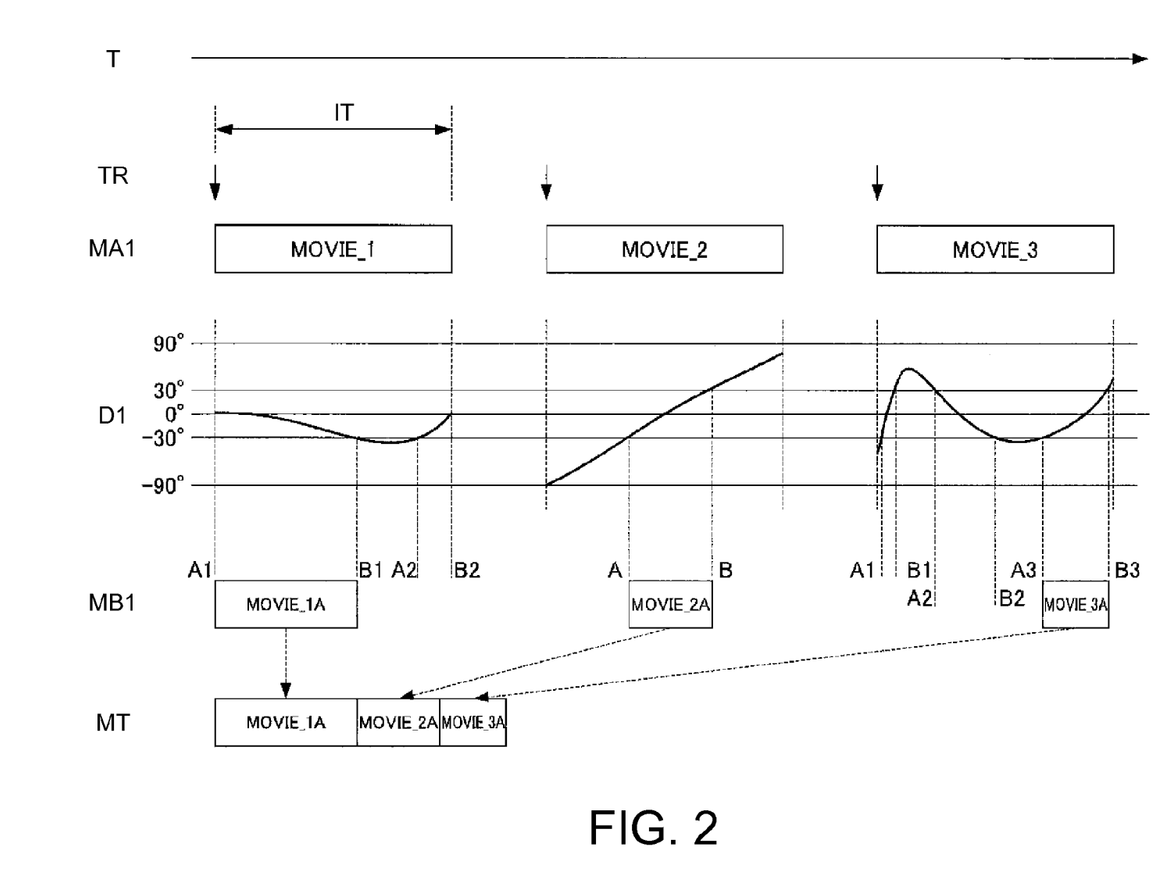
FIG. 2 is a schematic view of a method of generating a video having few shifts in the angle of view through interval imaging.

FIG. 2 is a schematic view of a method of generating a video having few shifts in the angle of view through interval imaging.

As shown in the example in FIG. 2, a scenario is described in which three videos MA1 (MOVIE_1, MOVIE_2, and MOVIE_3) have been obtained by interval imaging.

In this example, the imaging device 1 is at 0° when facing the horizontal direction, and areas within ±30° are areas having few shifts in imaging orientation. In other words, images are obtained when the angle of the device is within ±30° from a horizontal direction D1. In this example, when there are a plurality of areas having few shifts in the angle of view in the captured video, the period having the longer duration or the smaller degree of shifting (lower gradient) is obtained.

In MOVIE_1, the angle D1 of the device when recording starts is 0° (in other words, approximately horizontal), but afterwards the angle D1 of the device changes to −30° while the recording is still in progress. Thereafter, the angle D1 of the device goes above −30° and returns to 0° right before the recording finishes.

The posture of the device (imaging orientation) changes from an initial horizontal orientation to a downwards orientation thereafter, and then finally to the horizontal orientation again.

The duration of recording time in areas having few shifts in imaging orientation is expressed by the A1-B1 segment, which changes gradually over a long period of time, and the A2-B2 segment, which changes over a short period of time.

Accordingly, in MOVIE_1, MOVIE_1A, which is taken during the A1-B1 segment, is used as the period that has few shifts in imaging orientation.

In MOVIE_2, the angle D1 of the device when recording starts is −90° (in other words, approximately vertical), but afterwards the angle D1 of the device shifts from −30° to 30° and then eventually to 90° while the recording is still in progress.

Accordingly, in MOVIE_2, MOVIE_2A, which is taken during the A-B segment, is used as the period that has few shifts in imaging orientation.

In MOVIE_3, the angle D1 of the device when recording starts is around −30°, but afterwards rapidly rises to around 30°, gradually falls to around −30°, and then finally returns to around 30°. The posture of the device (imaging orientation) is initially oriented slightly downward and then slightly upward, and then slowly orients slightly downward, after which the posture of the device is slowly oriented upward.

The periods of recording time among the areas having few shifts in imaging orientation are expressed by the A1-B1 segment, which changes rapidly over a short period of time, the A2-B2 segment, which changes gradually over a long period of time, and the A3-B3 segment, which has a gradual change that is greater than that of the A2-B2 segment.

Accordingly, in MOVIE_3, MOVIE_3A, which is taken during the A3-B3 segment, is used as the period that has few shifts in imaging orientation.

In the imaging device 1, the imaging orientation is identified from the tilt of the device, and the periods that have few shifts in imaging orientation are determined in order to generate videos having few shifts in imaging orientation MB1, which are videos having the extracted periods described above.

In the imaging device 1, the videos MB1 (videos having few shifts in imaging orientation), which are the extracted periods that have few shifts in imaging orientation, are linked together to generate a single combined video MT.

Figure 3:
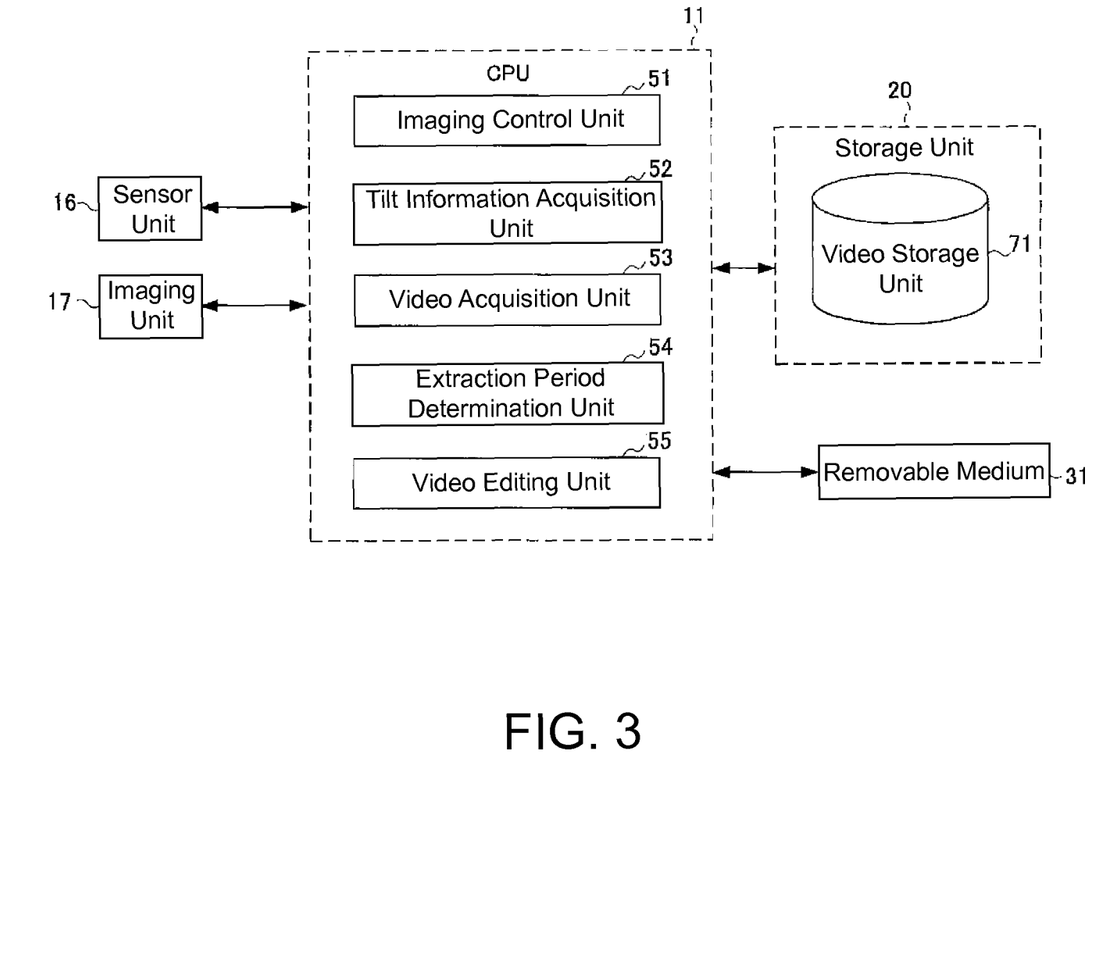
FIG. 3 is a functional block view for running the process of generating a video having few shifts in the angle of view from the functional configuration of the imaging device in FIG. 1.

FIG. 3 is a functional block view for running the process of generating a video having few shifts in imaging orientation from the functional configuration of this type of imaging device 1.

The process of generating a video having few shifts in imaging orientation is a series of processes that include extracting a plurality of periods that have few shifts in imaging orientation from a plurality of videos in order to generate videos having few shifts in imaging orientation MB1, and then linking these plurality of videos having few shifts in imaging orientation MB1 to generate the single combined video MT.

In the present embodiment, the periods that have few shifts in imaging orientation are extracted from a plurality of videos that are obtained by a plurality of imaging being performed at prescribed intervals. These extracted periods are then linked together to generate the single combined video MT.

As shown in FIG. 3, in the process to generate a video having few shifts in imaging orientation, an imaging control unit 51, a tilt information acquisition unit 52, a video acquisition unit 53, an extraction period determination unit 54, and a video editing unit 55 function in the CPU 11.

A video storage unit 71 is provided in one area of the storage unit 20.

The video storage unit 71 temporarily stores the plurality of videos obtained by the interval imaging.

When imaging initialization conditions occur (hereinafter, a trigger TR), such as a command for imaging initialization received from the input unit 18 or a prescribed passage of time, the imaging control unit 51 causes the sensor unit 16 to start measuring changes in posture of the device and causes the imaging unit 17 to start recording videos.

The tilt information acquisition unit 52 obtains sensor values, which are the tilt information, from the sensor unit 16. Specifically, the tilt information acquisition unit 52 obtains tilt information when the imaging unit 17 starts recording.

The video acquisition unit 53 obtains the videos MA1 that have been taken by the imaging unit 17. The video acquisition unit 53 temporarily stores the obtained videos MA1 in the video storage unit 71, which is an internal memory.

The extraction period determination unit 54 determines a range in which periods of permissible tilt are extracted from the videos MA1 in accordance with the orientation of the device obtained from the tilt information. In the present embodiment, permissible tilt is a prescribed range (within ±30°, for example) from a reference posture to a point at which shaking of the screen causes viewing of the video to be awkward.

When there are a plurality of periods to be extracted from the videos MA1, the extraction period determination unit 54 determines a single period to extract on the basis of length of the respective period, rate of change in the respective periods, or the like.

Specifically, as shown in FIG. 2, the extraction period determination unit 54 determines MOVIE_1A taken in the A1-B1 segment in MOVIE_1, MOVIE_2A taken in the A-B segment in MOVIE_2, and MOVIE_3A taken in the A3-B3 segment in MOVIE_3 as the periods to be extracted.

The video editing unit 55 extracts the periods determined by the extraction period determination unit 54 from the videos MA1 temporarily stored in the video storage unit 71. The video editing unit 55 sets the extracted periods as the videos having few shifts in imaging orientation MB1, and these are stored in the removable media 31, which is an external memory.

When there are a plurality of the videos (periods) having few shifts in imaging orientation MB1 that have been extracted, the video editing unit 55 links these videos (periods) having few shifts in imaging orientation MB1 to generate the single combined video MT. The video editing unit 55 stores the combined video MT in the removable media 31, which is an external memory.

Figure 4:
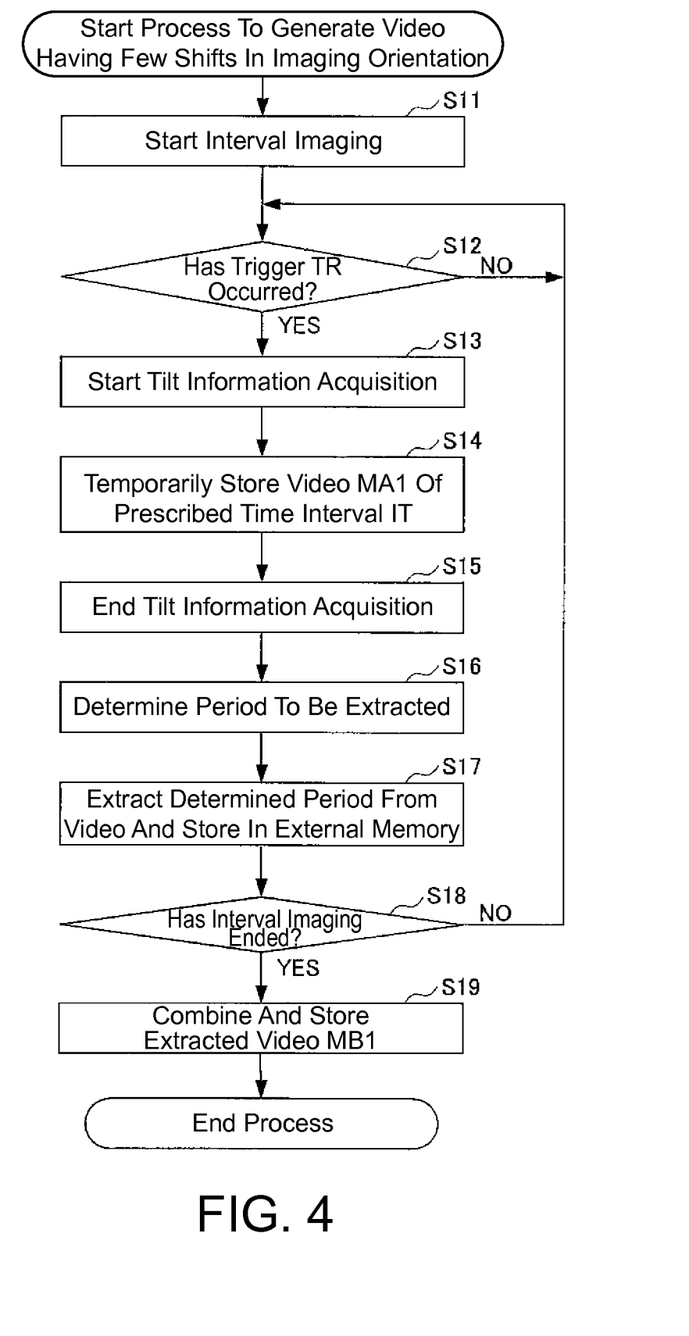
FIG. 4 is a flow chart for explaining the flow of the process of generating a video having few shifts in the angle of view that is executed by the imaging device of FIG. 1 having the functional configuration in FIG. 3.

FIG. 4 is a flow chart for explaining the flow of the process of generating a video having few shifts in imaging orientation that is executed by the imaging device 1 of FIG. 1 having the functional configuration in FIG. 3.

The process of generating a video having few shifts in imaging orientation is started by the user operating the input unit 18 in a manner that initializes the process of generating a video having few shifts in imaging orientation.

The CPU 11 starts the interval imaging (video recording) (step S11). In the imaging device 1, a prescribed number of imaging is performed by the imaging unit 17 and a prescribed amount of measuring is performed by the sensor unit 16 at prescribed time intervals IT. In the present embodiment, the trigger TR for the recording and measurement is based on passage of time T.

The imaging control unit 51 determines whether the trigger TR has occurred (step S12).

The imaging control unit 51 determines NO when the trigger TR has not occurred, and goes into standby until the trigger occurs.

The imaging control unit 51 determines YES when the trigger TR has occurred and the process moves to step S13. As a result of the trigger TR occurring, the imaging control unit 51 drives the imaging unit 17 to start imaging (video recording) and drives the sensor unit 16 to start measuring.

The tilt information acquisition unit 52 starts obtaining sensor values, which will be the tilt information outputted by the sensor unit 16 (step S13).

The video acquisition unit 53 obtains the videos MA1 taken in the prescribed interval of time IT by the imaging unit 17 and buffers these obtained videos MA1 in the video storage unit 71, which is an internal memory (step S14). The obtained videos MA1 are temporarily stored in the video storage unit 71.

The tilt information acquisition unit 52 ends tilt information acquisition from the sensor unit 16 (step S15).

The extraction period determination unit 54 determines periods to be extracted from the videos MA1 in accordance with the tilt information obtained by the tilt information acquisition unit 52 (step S16).

The extraction period determination unit 54 determines a range in which periods are to be extracted in the videos during a tilt of the imaging device 1 within a prescribed value (within ±30° in the present embodiment) from a reference posture.

In the example shown in FIG. 2, in accordance with length, rate of change in orientation, or the like, the extraction period determination unit 54 chooses MOVIE_1A in MOVIE_1, MOVIE_2A in MOVIE_2, and MOVIE_3A in MOVIE_3 as the periods to be extracted.

The video editing unit 55 extracts the periods that have been chosen by the extraction period determination unit 54 from the videos MA1 temporarily stored in the video storage unit 71 and stores these in the removable media 31, which is an external memory (step S17).

The CPU 11 determines whether or not interval imaging (video recording) has ended. The interval imaging ends when the prescribed amount of imaging and measuring has been performed (step S18).

If interval imaging has not ended, the CPU 11 determines NO, and the process returns to step S12.

If interval imaging has ended, the CPU 11 determines YES, and the process proceeds to step S19.

The video editing unit 55 links and stores the extracted videos MB1 in the removable media 31, which is an external memory, and generates the combined video MT (step S19). This makes it possible to generate a video having an insignificant amount of shaking.

Thereafter, the process to generate a video having few shifts in imaging orientation is ended.

Modification Example

In the embodiment described above, the range defined as having few shifts in imaging orientation is expressed by an area that is within ±30° of 0°, with 0° in the horizontal direction being the reference posture. In this modification example, however, the range defined as having few shifts in imaging orientation is a prescribed range from the center of shifting in all of the obtained videos (±30° in the present embodiment).

Figure 5:
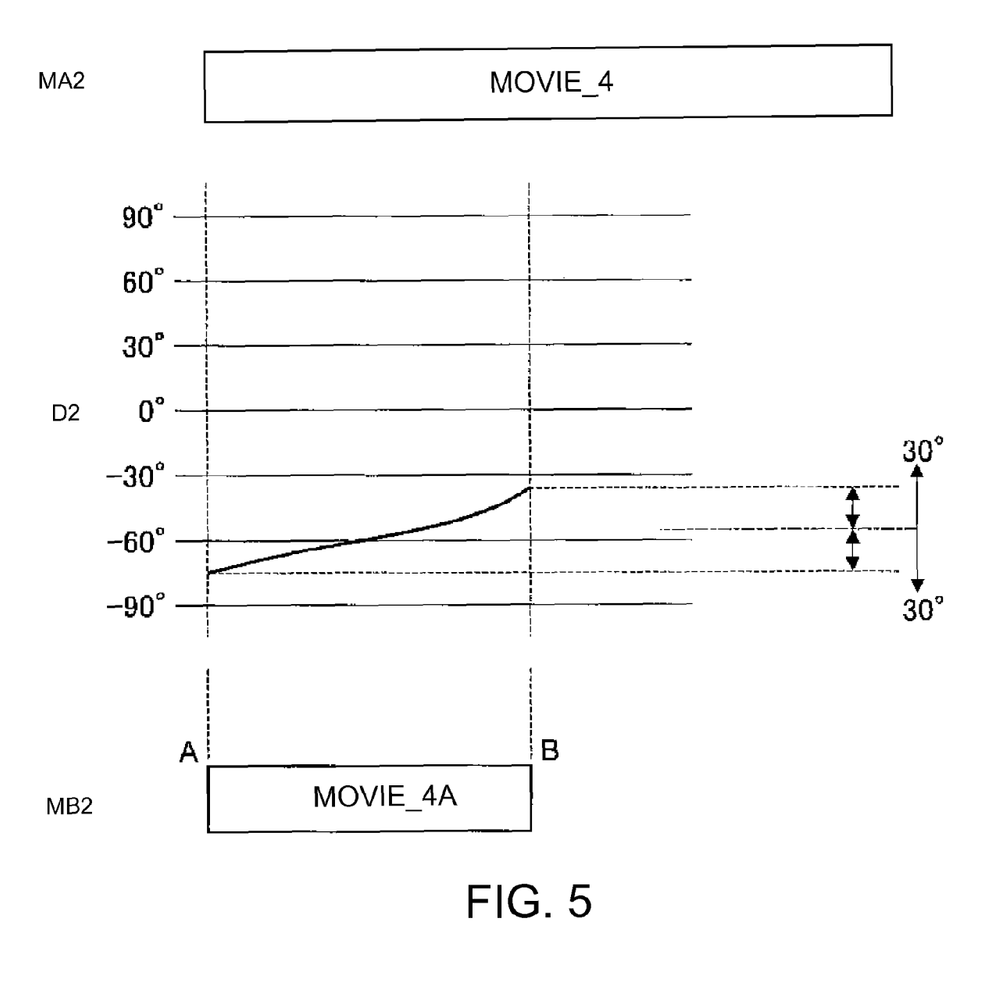
FIG. 5 is a schematic view showing another example of determining a period having few shifts in the angle of view.

FIG. 5 is a schematic view of another example for determining a range having few shifts in imaging orientation.

Specifically, in the example shown in FIG. 5, when the imaging orientation is shifting within the −35° to −75° range from the horizontal direction, ±30° (in other words, −25° to 85°) is chosen as the range having few shifts in imaging orientation with −55°, which is in the center, as the new reference.

In this manner, during imaging it is possible to obtain videos where the periods with significant shaking have been removed even if the imaging device 1 is not facing the horizontal direction.

The imaging device 1 as described above includes the video acquisition unit 53, the tilt information acquisition unit 52, and the extraction period determination unit 54.

The video acquisition unit 53 obtains the videos MA1.

The tilt information acquisition unit 52 obtains information related to shifts in posture, which are the shifts in imaging orientation during capturing of the videos.

The extraction period determination unit 54 determines a period in which the videos MA1 will be extracted in accordance with the information obtained by the tilt information acquisition unit 52.

Accordingly, the imaging device 1 can provide videos having few shifts in imaging orientation. This makes it possible to avoid disturbance or awkwardness caused by shifts in imaging orientation when viewing the videos.

The imaging device 1 further includes the imaging unit 17.

The tilt information acquisition unit 52 obtains information related to shifts in posture of this device.

Accordingly, with the imaging device 1, it is possible to provide videos having few shifts in imaging orientation in videos that have been taken by the imaging device 1 itself.

The tilt information acquisition unit 52 obtains at least the imaging orientation of the device or the degree of change in the posture of the device from the tilt information received by the sensor unit 16.

This makes it possible for the imaging device 1 to determine shifts in posture of the device indicating movement in imaging orientation, thereby allowing videos with few shifts in imaging orientation to be provided.

The imaging device 1 includes the video editing unit 55.

Among the videos MA1 taken by the imaging unit 17, the video editing unit 55 extracts the videos MB1 that are within a preconfigured range to be stored in accordance with the information obtained by the tilt information acquisition unit 52.

Accordingly, the imaging device 1 can provide videos having few shifts in imaging orientation.

The imaging device 1 takes videos at prescribed intervals.

This makes it possible to apply the imaging device 1 to imaging techniques such as interval imaging.

The video editing unit 55 links a plurality of videos MB1 of periods that have been extracted by the extraction period determination unit 54 and combines this into the single combined video MT.

This makes it possible for the imaging device 1 to obtain a combined video that combines a plurality of videos having few shifts in imaging orientation.

When there are a plurality of periods in which the degree of movement of the imaging orientation obtained by the tilt information acquisition unit 52 is below a prescribed value, the extraction period determination unit 54 chooses the longest period as the period to be stored.

Due to this, the imaging device 1 can obtain longer and more stable videos when there are a plurality of obtainable videos (periods).

When there are a plurality of periods in which the degree of movement of the imaging orientation obtained by the tilt information acquisition unit 52 is below a prescribed value, the extraction period determination unit 54 chooses the period with the least degree of shifting as the period to be stored.

This makes it possible for the imaging device 1 to obtain videos that have even fewer shifts in imaging orientation when there are a plurality of obtainable videos.

The imaging device 1 further includes the removable media 31 that stores videos in periods that are determined by the extraction period determination unit 54.

This makes it possible for the imaging device 1 to store videos on its own.

The present invention is not limited to the embodiments above, and includes changes, modifications, or the like made within a scope by which it is possible to attain the object of the present invention.

In the respective embodiments described above, the trigger TR is a prescribed passage of time for interval imaging, but the trigger TR for imaging may be a movement distance of the device measured by GPS (global positioning system) or the like, for example.

In the respective embodiments described above, when the trigger TR occurs, imaging is performed (the imaging unit 17 is driven), but the present invention is not limited to this, and imaging may be performed after shaking of the device has stabilized to a point where shifts in imaging orientation have become insignificant, for example.

Specifically, this configuration may include the imaging control unit 51 that drives the imaging unit 17 in accordance with information obtained by the tilt information acquisition unit 52.

This makes it possible for the imaging device 1 to obtain videos having an insignificant amount of shaking due to imaging being started after the shaking of the device has stabilized.

After the shaking of the device has stabilized, it is possible to choose and extract periods having few shifts in imaging orientation from the videos obtained by the imaging, thereby making it possible to obtain videos having even fewer shifts in imaging orientation.

In the respective embodiments described above, no mention of adjustment of the imaging orientation has been made, but a configuration is possible that, when the distance to the object to be filmed is short, the range of permissible shaking is adaptively modified in accordance with imaging orientation such as by narrowing the range of permissible shaking, for example.

In the respective embodiments described above, the length of the respective videos being linked together is not considered with respect to the combined video, but the length of these videos may be adjusted before being combined. Length adjustment of the videos may be performed by adjusting the videos for a small video or interpolating between frames for a small video.

In the respective embodiments described above, when there are a plurality of periods having few shifts in imaging orientation in a single video, one period is chosen in accordance with length of time or rate of change, but all of the periods may be chosen or a plurality of periods that satisfy prescribed conditions may be chosen.

In the respective embodiments described above, the plurality of videos are taken by interval imaging that captures the videos in intervals, but it is also possible to use a video that has been taken without intervals, or a video that has been taken at different times.

In the respective embodiments described above, extraction period determination and linking and storing is performed by the imaging device 1, but the present invention is not limited to this, and extraction period determination and linking and storing and the like may be performed by an external device. In this case, the imaging device 1 would perform recording of the videos, acquisition of at least the imaging orientation or degree of change in posture, and recording after the recorded videos have been correlated with at least the imaging orientation or the degree of change in posture.

In the respective embodiments described above, vertical orientation was mentioned, but the present invention may also be applied to shaking in the direction in which the shifts in imaging orientation occur (the horizontal direction and the like, for example).

In the respective embodiments described above, the reference posture is the horizontal direction or the center of shaking in the entire video, but the present invention is not limited to this, and the user may choose videos or set a specific object as the reference potential.

In the respective embodiments described above, the imaging device 1 of the present invention is described as a wearable camera as an example, but the present invention is not limited to this.

The present invention can also be generally applied to electronic devices having a function that generates videos having few shifts in imaging orientation, for example. Specifically, the present invention can be applied to notebook personal computers, printers, television receivers, video cameras, portable navigation devices, mobile phones, smartphones, portable game systems, and the like.

The series of processes described above can be accomplished by hardware or software.

In other words, the functional configuration in FIG. 3 is merely an example, and the present invention is not limited to this. Namely, the type of functional blocks used to achieve these functions are not limited to the example in FIG. 3 as long as a function in which the series of processes described above can be fully executed is included in the imaging device 1.

One functional block may be a single hardware unit or a single software unit, or these may be combined.

If the series of processes are accomplished by software, the programs constituting the software are installed on a computer or the like through a network or a storage medium.

The computer may be installed in specialized hardware. The computer may be a computer that can execute various functions by installing various programs, or it may be a general personal computer, for example.

The storage medium including such a program is not only constituted of the removable media 31 in FIG. 1 that is distributed separately from the main device body in order to provide the user with programs; it is also constituted of a storage medium or the like provided to the user pre-installed in the main device body. The removable medium 31 is a magnetic disk (including floppy disks), an optical disk, a magneto-optical disk, or the like, for example. The optical disk is constituted of a CD-ROM (compact disk-read only memory), a DVD (digital versatile disk), a Blu-ray (registered trademark) Disc, or the like, for example. The magneto-optical disk is an MD (Mini-Disk) or the like. The storage medium provided to the user pre-installed in the main storage body is the ROM 12 in FIG. 1 in which a program is stored, or a hard disk or the like included in the storage unit 20 in FIG. 1, for example.

In the present specification, the step of storing the programs in the storage medium includes not only time-oriented processes that take place in that order but also parallelly or individually executed processes.

Several aspects of the present invention were described above, but these are merely examples and do not limit the technological scope of the present invention. Various other embodiments can be made of the present invention, and it is possible to make various modifications such as omissions or replacements of elements within a scope that does not depart from the gist of the present invention. Embodiments and modifications thereof are included in the scope and gist of the invention disclosed in the present specification and the like, and are included in the invention disclosed in the claims and an equivalent thereof.

What is claimed is:

1. A video processing device, comprising:
a processor configured to:
  acquire video data representing a video that has been taken by a video capturing unit;
  acquire posture data representing a posture of the video capturing unit while the video capturing unit is taking the video; and
  determine, based on the acquired video data and the acquired posture data, a period or periods in the video data that meet a prescribed condition for the posture of the video capturing unit; and
  extract data representing said period or periods from the video data and output said data representing the extracted period or periods so as to be stored in a storage unit for further processing.

2. The video processing device according to claim 1, wherein the processor is configured to:
  when a plurality of said periods have been extracted, combine said plurality of periods to produce an edited video and outputs data representing said edited video.

3. The video processing device according to claim 1, wherein the prescribed condition is that an imaging angle of the video capturing unit during the taking of the video falls within a prescribed range during said period, and
wherein, when a plurality of said periods have been determined, the processor chooses a longest period and discards the remaining periods to produce an edited video, and outputs data representing the edited video.

4. The video processing device according to claim 1, wherein the prescribed condition is that an imaging angle of the video capturing unit during the taking of the video falls within a prescribed range during said period, and
wherein, when a plurality of said periods have been determined, the processor chooses a period having a lowest amount of changes in the imaging angle and discards the remaining periods to produce an edited video, and outputs data representing the edited video.

5. The video processing device according to claim 1, wherein the processor unit acquires, as the posture data representing the posture of the video capturing unit, at least one of an imaging angle of the video capturing unit and a change in imaging position of the video capturing unit.

6. The video processing device according to claim 1, further comprising the video capturing unit that takes the video.

7. The video processing device according to claim 6, wherein the processor is configured to drive the video capturing unit in accordance with the acquired data representing the posture of the video capturing unit.

8. The video processing device according to claim 1, wherein the video is taken at prescribed intervals.

9. The video processing device according to claim 1, further comprising a storage unit that stores the period or periods outputted by the processor.

10. A method of processing a video, comprising:
acquiring video data representing a video that has been taken by a video capturing unit;
acquiring posture data representing a posture of the video capturing unit while the video capturing unit is taking the video;
determining, based on the acquired video data and the acquired posture data, a period or periods in the video data that meet a prescribed condition for the posture of the video capturing unit; and
extracting data representing said period or periods from the video data and outputting said data representing the extracted period or periods so as to be stored in a storage unit for further processing.

11. A non-transitory storage medium that stores instructions executable by a computer, said instructions causing the computer to perform the following:
acquiring video data representing a video that has been taken by a video capturing unit;
acquiring posture data representing a posture of the video capturing unit while the video capturing unit is taking the video;
determining, based on the acquired video data and the acquired posture data, a period or periods in the video data that meet a prescribed condition for the posture of the video capturing unit; and
extracting data representing said period or periods from the video data and outputting said data representing the extracted video period or periods so as to be stored in a storage unit for further processing.

12. A digital camera, comprising:
a video capturing unit that takes a video and outputs video data representing the video taken;
a sensor unit that detects an imaging angle of the video capturing unit and outputs imaging angle data representing the imaging angle of the video capturing unit while the video capturing unit is taking the video;
a video memory;
a storage medium; and
a processor connected to the video capturing unit, the sensor, the video memory, and the storage medium,
wherein the processor receives said video data and temporarily stores said video data in the video memory, and the processor further receives the imaging angle data and analyzes the temporarily stored video data in accordance with the imaging angle data so as to determine a period or periods in the stored video data during which the imaging angle of the video capturing unit falls within a prescribed range, and
wherein the processor extracts data representing said period or periods, during which the imaging angle of the video capturing unit falls within the prescribed range, from the stored video data, discards the remaining data in the stored video data, and outputs said data representing said extracted period or periods to the storage medium for storage.

* * * * *